US007493841B1

(12) United States Patent
Kaplan

(10) Patent No.: US 7,493,841 B1
(45) Date of Patent: Feb. 24, 2009

(54) SLICER

(76) Inventor: Robert E. Kaplan, 121 Trenor Dr., New Rochelle, NY (US) 10804

(*) Notice: Subject to any disclaimer, the term of this patent is extended or adjusted under 35 U.S.C. 154(b) by 0 days.

(21) Appl. No.: 11/038,641

(22) Filed: Jan. 19, 2005

(51) Int. Cl.
*B23D 35/00* (2006.01)

(52) U.S. Cl. ............................ 83/676; 83/932; 83/856; 83/872; 83/109; 83/714; 83/435.11; 83/435.25; 83/437.6; 83/437.7; 241/94; 241/262; 241/283

(58) Field of Classification Search .................. 83/932, 83/676, 356.2, 856, 147, 167, 471, 474, 471.2, 83/703, 707, 435.11, 870, 872, 874, 444, 83/109, 150, 153, 157, 162, 165, 713, 714, 83/730, 409.2, 431, 435.13, 435.15, 435.16, 83/435.25, 437.2, 437.6, 437.7, 440, 466.1; 241/262-269, 94, 95, 276, 283, 274; 99/537, 99/538

See application file for complete search history.

(56) References Cited

U.S. PATENT DOCUMENTS

| | | | | | |
|---|---|---|---|---|---|
| 2,311,618 | A | * | 2/1943 | Coleman | 83/157 |
| 2,593,543 | A | * | 4/1952 | Curioni | 83/56 |
| 3,683,985 | A | * | 8/1972 | Verhoeven | 83/221 |
| 4,186,543 | A | * | 2/1980 | Lyell | 53/515 |
| 4,249,445 | A | | 2/1981 | Browning | |
| 4,523,505 | A | | 6/1985 | Polson | |
| 4,685,364 | A | * | 8/1987 | Scheflow et al. | 83/68 |
| 4,776,252 | A | | 10/1988 | Herlitzius | |
| 5,340,039 | A | * | 8/1994 | Lefevre | 241/84 |
| 5,410,929 | A | * | 5/1995 | Wallace | 83/160 |
| 5,445,332 | A | * | 8/1995 | Shimizu et al. | 241/100 |
| 5,592,865 | A | * | 1/1997 | Lecrone | 83/872 |
| 5,732,610 | A | | 3/1998 | Halladay et al. | |
| 5,784,936 | A | * | 7/1998 | King | 83/145 |
| 5,881,621 | A | | 3/1999 | Dennis | |
| 5,903,982 | A | | 5/1999 | Gibson | |
| 5,927,701 | A | | 7/1999 | Chapman | |
| 6,619,170 | B2 | | 9/2003 | Kaplan | |

* cited by examiner

*Primary Examiner*—Boyer D Ashley
*Assistant Examiner*—Omar Flores-Sánchez
(74) *Attorney, Agent, or Firm*—Lloyd McAulay

(57) ABSTRACT

A machine for slicing food products, including a supported table surface with aperture for the passage therethrough of product slices; a power-driven cutting device having a horizontal blade extending above the table surface at a distance substantially corresponding to the slice thickness required; a guided horizontally sliding platform spaced above the cutting device; a power-driven reciprocating lateral thruster attached to the horizontal sliding platform for the purpose of moving the platform both to produce slices of food product and to clear the cutting device in the case it is jammed; and a vertical tube-shaped open-ended hopper rigidly supported by the horizontally sliding platform for containing a stack of food product items, the lowest item in the stack resting on the table surface and being pushed by the hopper into contact with the cutting device to produce a slice.

12 Claims, 4 Drawing Sheets

SLICER

FIELD OF THE INVENTION

The present invention relates to the slicing of food products and more particularly a slicing machine useful to bakeries, for cutting bagels into multiple thin slices.

BACKGROUND OF THE INVENTION

Bagels are torus-shaped bread products made of relatively dense dough and a smooth, tough, plastic-like outer skin and are frequently topped with poppy or sesame seeds. Bagels are in high demand and special outlets have been established which sell bagels as their primary product.

Bagels may be divided in two by a complete or partial horizontal cut, for toasting or in order to insert therein some other foodstuff such as cheese, vegetables, butter, fish, etc. Because of the tough, plastic-like character of their outer skin injury can easily occur when cutting is done by hand with an unguided knife. Consequently various bagel slicing devices which are much safer have been developed. Most such devices are hand-powered, but electrically powered slicers are also known.

Many U.S. patents describe bagel cutting devices intended primarily for home use, among them U.S. Pat. Nos. 4,249,445; 5,732,610; 5,881,621; 5,903,982 and 5,927,701. An automatic machine for cutting bagels in half is described in U.S. Pat. No. 4,776,252. The devices described in these patents are not slicing machines, however, in the sense that they only cut the bagel into two, or partially cut the bagel to produce a butterfly cut.

Bakeries producing bagels cannot know exactly how many bagels will be required for sale during the course of any given day, and are often faced with a substantial surplus at the end of the working day. Such bagels, even if frozen or refrigerated, cannot be sold as fresh product on the following morning. A solution to this problem is to slice the left-over bagels into multiple thin slices, typically 4 mm thick. The slices are then baked and packaged and sold as a separate product, referred to as "bagel chips." Further, the current trend of preference for low carbohydrate diets also makes the production of bagel chips desirable for bakers of bagels; a 4 mm thick bagel chip has about one tenth the carbohydrates of a 40 mm thick bagel and is therefore more likely to be bought and eaten by persons seeking to limit their consumption of carbohydrates. The relatively high prices customers are willing to pay for bagel chips should make them a significant profit center for the typical bagel bakery. Clearly, it is economically advantageous that the production of bagel slices for bagel chips be done by a machine which, once loaded with product, operates automatically without the need of a human operator.

The machines commonly seen in delicatessens for slicing cheese and meat have been used by bakeries to slice bagels for the preparation of bagel chips. Such machines have a disc-shaped rotary cutting blade and a reciprocating platform for supporting the food items to be sliced. An operator is needed to hold and advance the food into the blade. Production is slow and labor intensive and there is the ever-present danger of operator injury.

Bagel chips without a central hole have been produced by preparing rod-shaped pieces of bagel-type dough which are baked and then sliced by a food processor. A vertical feed tube guides the rod-shaped bread product into a rotating disk equipped with a slicer of the type commonly used for making potato chips. Aside from requiring an operator and failing to provide a solution for utilizing left-over bagels, this method does not provide consumers with the expected, characteristic washer-like bagel shape; the slices produced by this method are disk-shaped, with no hole in the center, and of diameter much smaller than that of a typical bagel.

A machine which produces multiple cuts of bagels has been marketed by ProBake, Inc., 2057 East Aurora Road, Twinsburg, Ohio, U.S.A. This machine has multiple reciprocating blades which preclude changing the thickness of the slices, and the bagels are fed through the machine by a gravity chute. The claimed output is 60 bagels per minute, the equivalent of about 600 slices per minute, and the machine is quite costly.

J. E. Grote Company, Inc. of Blacklick, Ohio markets slicers employing a band blade which it claims are capable of slicing bagels for bagel chips. While being good for slicing long "logs" of food such as cheese and meat, these machines have been criticized for being unable to properly slice the ends of relatively small stacked items such as apples and bagels and are therefore wasteful of product. In any case even the smallest machine of Grote takes considerable floor space and is quite expensive and is therefore hardly suitable for the typical bagel bakery.

U.S. Pat. No. 4,523,505 describes a feed chute apparatus adapted for mounting on a delicatessen-type rotary slicing machine but fails to meet the needs of efficiency and convenience for the typical bagel bakery because it requires an attendant to move the feed chute back and forth and because it cannot accommodate a convenient bin for collecting the bagel slices produced.

A carousel type bagel slicing machine is described by U.S. Pat. No. 6,619,170 B2. With it, a stack of bagels is contained in a vertical feed tube mounted on a vertically mounted rotating carrousel which passes over a rotating disk-shaped knife rising through a hole in a table top to a distance substantially equal to the thickness of the bagel slice desired. In operation the bottom bagel in the feed tube slides over the table surface until cut by the rotating knife and the bagel chip thus produced drops through the hole under the knife into a collection bin below. The chief drawback of this machine is that its revolving knife and revolving carrousel frequently jams and stalls, apparently as a result of downward pressure on the knife's upper surface exerted by the bagel being cut in much the same way that the pad of an automobile disk brake presses on the drum. When stalled, manual action is required to release the jammed knife and restart the operation of this slicer. As a result of its tendency to jam and stall, the carrousel type bagel slicing machine described in U.S. Pat. No. 6,619,170 B2 requires considerable supervision by an operator, thus defeating the aim of a machine to slice bagels automatically, with a human operator needed only to refill the hopper.

SUMMARY OF THE INVENTION

It is therefore one of the objects of the present invention to obviate the disadvantages of prior art machines for producing bagel slices and the fill the gap between manual cutting and expensive machines, by providing a machine which produces slices in the range of 30 to 60 per minute, provides for convenient collection in a bin of the slices produced, and requires no human operator to clear it when it jams and ceases its slicing action.

The present invention achieves the above objects by providing a machine for slicing food products comprising a supported table surface having an aperture for the passage therethrough of sliced product; a power-driven cutting device having a horizontal blade positioned above the table surface at a distance substantially corresponding to the slice thickness required; a guided, horizontally sliding platform mounted on rails and spaced above the cutting device; an open-ended tubular-shaped hopper rigidly supported by the sliding platform and suited to contain a stack of food product items; a jam-proof reciprocating lateral thruster attached to the horizontally sliding platform; an electric gear-motor for driving the cutting device and the reciprocating lateral thruster; and a clutch with torque limiter in the power transmission between the gear-motor and the cutting device. In operation the lowest item in the stack of food product items in the feed hopper rests on the table surface and is pushed by the horizontally moving hopper into contact with the cutting device to produce a slice. The torque limiter in the power transmission between the gear-motor and the cutting device allows for continued motion of the gear-motor and the lateral thruster in case the motion of the cutting device ceases. The lateral thruster imparts reciprocating motion to the sliding platform and automatically clears jams of the knife and sliding platform. When the lateral thruster pulls the sliding platform toward the cutting device it causes the food product item to be pushed through the cutting device. When the lateral thruster pushes the sliding platform away from the cutting device, if there is at the bottom of the hopper a food product item which has caused the knife to jam, the feed hopper with all the food product items in it is pushed way from the cutting device thereby automatically clearing any jam or stall of the cutting device and the sliding platform. If the feed tube fails to push the bottommost item in the feed tube entirely through the cutting device on its first attempt and thereby fails to complete a slice, it will try again and again until the slice is completed and drops through the hole under the cutting device. As a result, the machine, unattended, will continue to slice the food product items that have been loaded into the hopper until it is emptied.

In the preferred embodiment of the present invention, the cutting device is a rotating disk blade.

In the preferred embodiment of the present invention, both rotating disk blade and the reciprocating lateral thruster are driven by a single electric gear-motor.

Other embodiments of the invention will be described below.

BRIEF DESCRIPTION OF THE DRAWINGS

The invention will now be described with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a sectional front elevated view of a preferred embodiment of a slicer constructed according the present invention.

Figure 1:
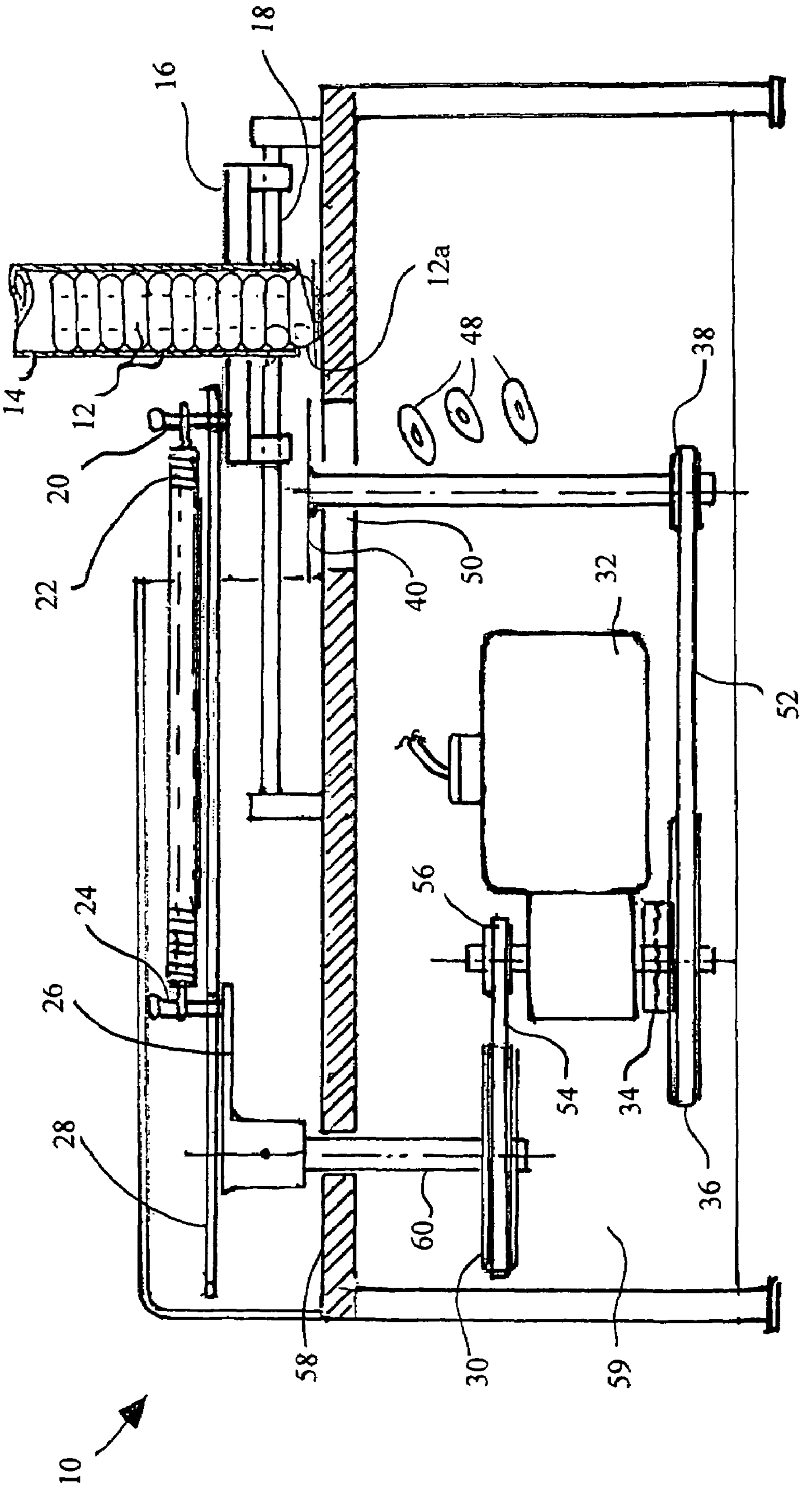
Figure 2A:
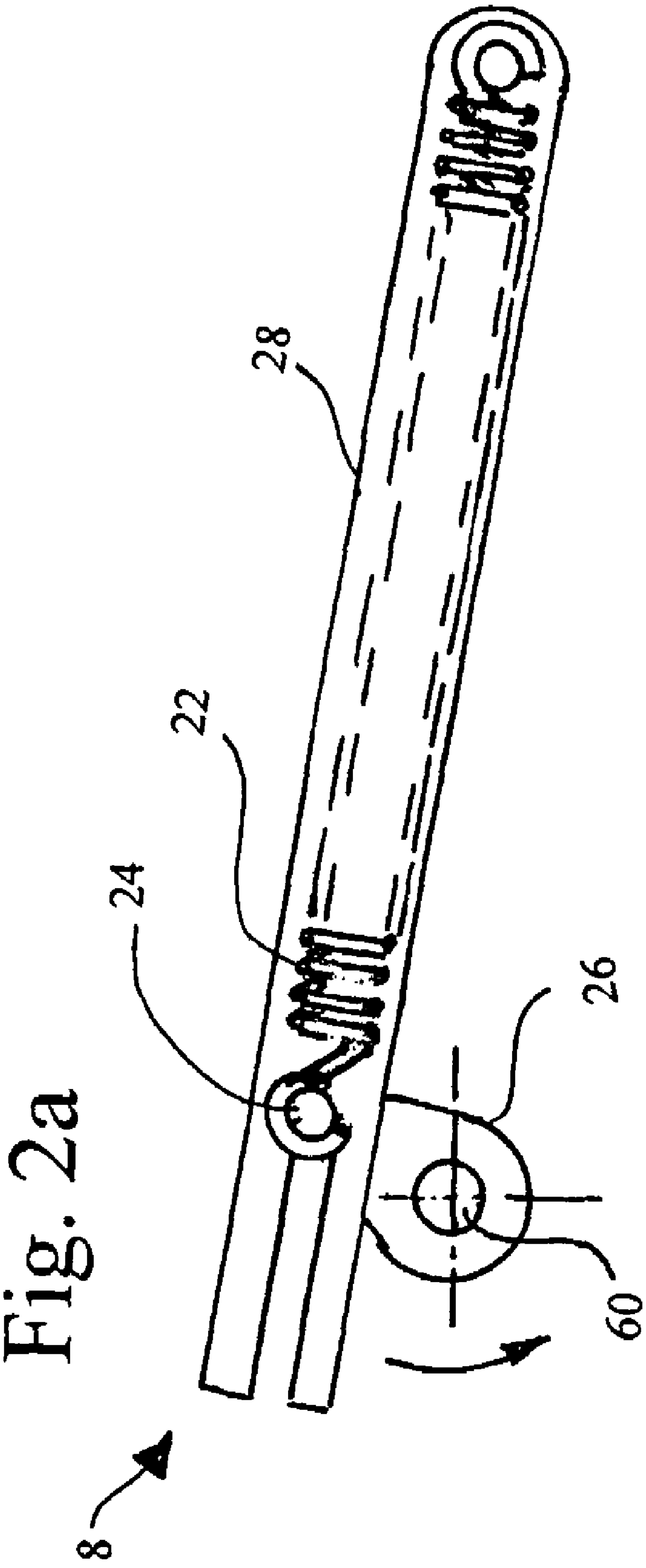

FIG. 2*a* is a perspective view of the reciprocating lateral thruster constructed according to the previous invention and used in the slicer shown in FIG. 1.

Figure 2B:
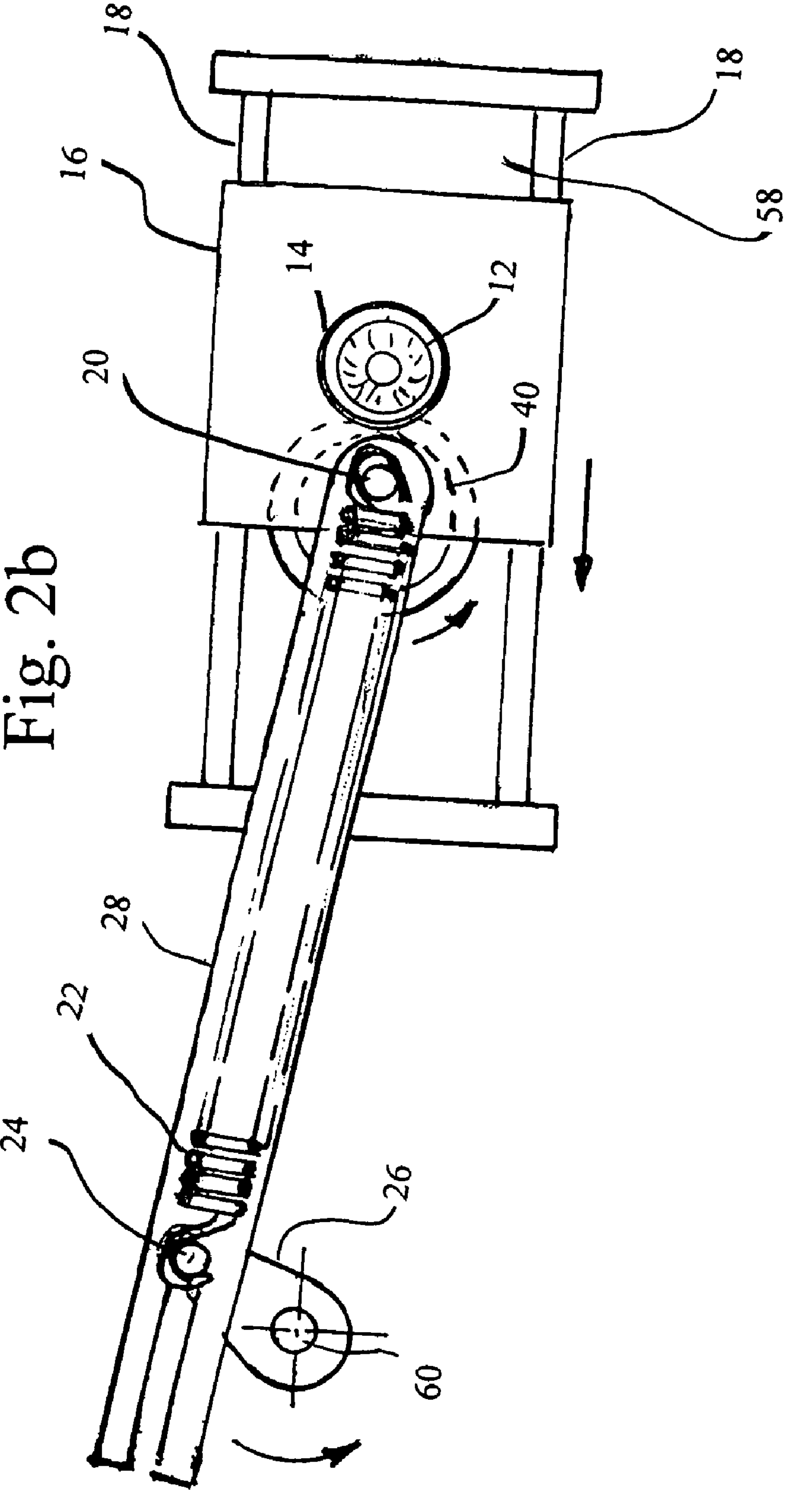

FIG. 2*b* is a top view of the reciprocating lateral thruster connected to the sliding platform with feed hopper while engaged in normal slicing.

Figure 2C:
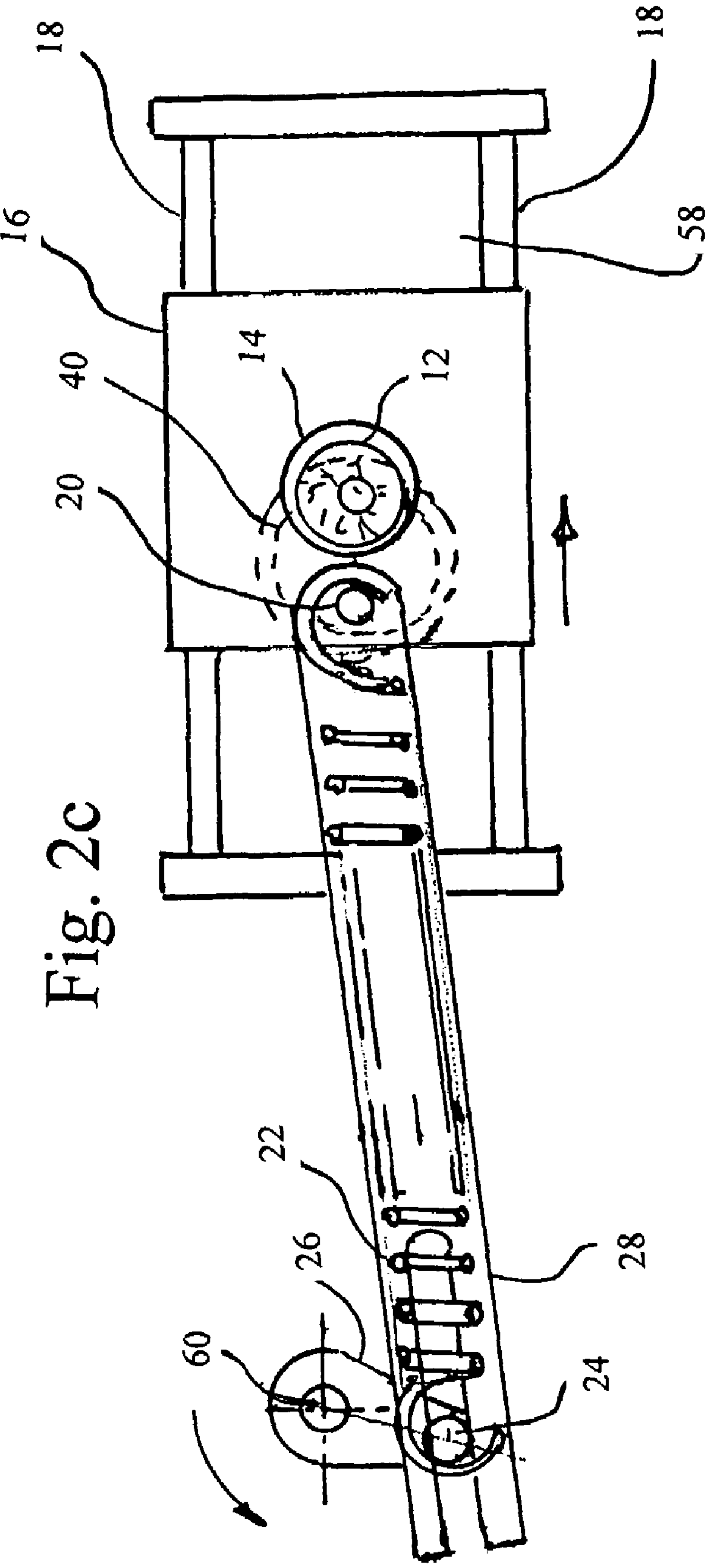

FIG. 2*c* is a top view of the reciprocating lateral thruster connected to the sliding platform with feed hopper adapting to a slicing failure in which the feed tube platform ceases its travel toward the rotary disc blade.

DETAILED DESCRIPTION OF THE PREFERRED EMBODIMENTS

FIG. 1 illustrates a machine 10 for slicing food products. In the embodiment shown, the food product is a bagel 12. A machine housing 59 is provided with a table top with smooth surface 58 near its upper extremity. Table top 58 has an aperture 50, allowing a cutting device 40, described below, to project therethrough and allow passage therethrough of the product slices 48 cut by machine 10.

Cutting device 40 is positioned above the surface of table top 58 at a distance substantially corresponding to the slice thickness required, typically between 3 and 5 mm. In the preferred embodiment shown, the cutting device is a rotary disk blade 40 having a diameter exceeding the cross section of the food product, bagel 12, and driven by an electric gear-motor 32.

FIG. 2*a* illustrates a reciprocating lateral thruster 8. Lateral thruster 8 is comprised of a rotating arm 26 with an offset pin 24, a tension spring 22 attached at one end to offset pin 24 on rotating arm 26 and a rigid rod 28, one end of which abuts offset pin 24. There are two phases in the thruster's action: one in which offset pin 24 travels towards rotary disc blade 40, the second in which offset pin 24 travels away from disc blade 40.

Returning to FIG. 1, rotating arm 26 is powered by gear-motor 32 by means of a pulley 56, a drive belt 54 and a pulley 30 mounted on a vertical shaft 60. Platform 16 slides on a pair of rails 18 and rigidly supports a tube-shaped open-ended feed hopper 14 which contains a stack of food product items, such as bagels 12. The bottommost bagel 12*a* rests on the surface of table 58, and is pushed by hopper 14 into contact with rotating disk knife 40 producing a slice 48 on each complete pass of the bottom opening of hopper 14 past the cutting edge of knife 40 while traveling toward knife 40. The slice thus produced drops through aperture 50 to be collected in an appropriate bin below. A torque limiter 34 attached to pulley 36 allows gear-motor 32 and, consequently, arm 26 to continue rotating in the case that knife 40 ceases motion.

FIG. 2*b* depicts the operation of reciprocating lateral thruster 8 in normal slicing, when no jam halts the motion of knife 40 or impedes the motion of platform 16. In normal slicing each revolution of offset arm 26 imparts a full forward-and-back travel to feed tube 14 and produces a slice as the bottommost food product contained in feed tube 14 passes through the cutting edge of knife 40. During normal slicing, tension spring 22 remains unstretched and acts in effect as a solid rod, and platform 16 is pushed away from knife 40 by rigid arm 28.

FIG. 2*c* depicts lateral thruster 8 during abnormal slicing when the motion of disk knife 40 ceases or when platform 16 travels slower than in "normal slicing" or ceases motion entirely. In this case arm 26 continues to rotate, tension spring 22 stretches while offset pin 24 travels away from knife 40 and contracts while pin 24 travels towards knife 40. While offset pin 24 travels towards knife 40 it pushes rigid arm 28 against pin 20 mounted on platform 16 causing platform 16 and the bottommost, partially sliced bagel 12*a* to move away from knife 40 allowing the motion of knife 40 and platform 16 to recommence. Machine 10 continues attempting to complete a started slice until successful.

A machine described herein may produce 20 to 30 slices per minute. With suitable gearing, output could reasonably be increased to 50 or 60 slices per minute.

Typically machine 10 uses a disk shaped blade with a smooth cutting edge. It is likely that a blade with a moderately serrated edge would reduce the cutting forces required and facilitate operation without jamming and without the necessity of repeated passes of the slice being cut against the disk knife.

One advantage of the present invention is that there is no difficulty in changing the thickness of the slice produced by either raising or lowering the level of disk shaped knife 40 or by arranging a section of table 58 adjacent to knife 40 to be raised or lowered.

Another advantage of the present invention is that if a complete slice is not produced while platform 16 travels towards knife 40, tension spring 22 will be stretched and therefore continue to press bottom bagel 12*a* against knife 40 while platform 16 travels away from knife 40, thereby increasing the machine's efficiency.

Although the machine of the present invention has been developed for slicing bagels, it could be used to slice other food products and the references to bagels in the present text are not intended to limit the use of the machine for this purpose.

In another embodiment of the present invention, the slicer may employ two motors, one to drive the cutting device and another to drive the reciprocating lateral thruster.

It is readily evident that in other embodiments

A compression spring instead of an expansion spring could be employed in the lateral thruster.

Feed hoppers of various shapes could be employed to accommodate food products of various shapes, such as rectangular, and square shaped loaves.

In a further embodiment of the present invention

A reciprocating pneumatic piston of suitable length and adjusted to cease forward motion when met by the lateral force resulting from a stalled platform could be employed to drive the sliding platform.

The construction of such a pneumatic device is well known to those skilled in the art.

The slicer of the present invention provides a compact, economical device that can be employed by bagel bakers to efficiently prepare slices for bagel chips. Use of the device is not limited, however, to the slicing of bagels. Bread bakeries could utilize the invention to efficiently produce thin slices of various types of breads which can then be rebaked to prepare "crisps" such as those marketed by Eli's Crisps of New York City. The slicer of the invention, with its novel means of automatically unjamming itself when it stalls, has the advantage that its operation requires no special supervision other than loading it with product to be sliced.

While the above description contains many specifities, these should not be construed as limitations on the scope of the invention, but rather as exemplifications of one preferred embodiment thereof. Many other variations are possible.

What is claimed is:

1. A machine for slicing a food product such as bagels, the machine having a hopper of food product on a platform and a cutting blade which are cycled to move toward and away from each other and having a source of motor power for powering the blade and moving the hopper and blade relative to one another through a cycle having (i) a first phase during which the blade and hopper are moved into engagement and during which cutting occurs, and (ii) a second phase during which the blade and hopper are moved out of engagement, the improvement comprising:

an arm coupled to the source of motor power to move the hopper and blade relative to one another through the first phase, said arm being extendable as a function of the axial force exerted on said arm when cutting during the first phase, said arm extending in length to limit the force between the cutting blade and the food product in the hopper during the first phase of the cycle, the cutting blade engaging and cutting the food product during the second phase when said arm is extended, the duration of said cutting during the second phase being a function of the amount by which said arm is extended.

2. The slicing machine of claim 1 wherein the platform is moved by said arm through the first phase.

3. The slicing machine of claim 1 wherein said arm is a spring.

4. The slicing machine of claim 2 wherein said arm is a spring.

5. The slicing machine of claim 1 wherein when the arm is extended during the second phase and the slicing of the food product is not completed, the cycle is repeated until the food product is sliced.

6. The slicing machine of claim 1 further comprising:

a rigid rod coupled between the platform and the source of motor power to provide transmission of force along said rod during the second phase of the cycle to move the hopper and blade out of engagement during at least part of the second phase of said cycle.

7. The slicing machine of claim 2 further comprising:

a rigid rod coupled between the platform and the source of motor power to provide transmission of force along said rod during the second phase of the cycle to move the hopper and blade out of engagement during at least part of the second phase of said cycle.

8. The slicing machine of claim 3 further comprising:

a rigid rod coupled between the platform and the source of motor power to provide transmission of force along said rod during the second phase of the cycle to move the hopper and blade out of engagement during at least part of the second phase of said cycle.

9. The slicing machine of claim 4 further comprising:

a rigid rod coupled between the platform and the source of motor power to provide transmission of force along said rod during the second phase of the cycle to move the hopper and blade out of engagement during at least part of the second phase of said cycle.

10. The slicing machine of claim 5 further comprising:

a rigid rod coupled between the platform and the source of motor power to provide transmission of force along said rod during the second phase of the cycle to move the hopper and blade out of engagement during at least part of the second phase of said cycle.

11. A machine for slicing a food product such as bagels, the machine having a hopper of food product on a platform and a cutting blade which are cycled to move toward and away from each other and having a source of motor power for powering the blade and moving the hopper and blade relative to one another through a cycle having (i) a first phase during which the blade and hopper are moved into engagement and during which cutting occurs, and (ii) a second phase during which the blade and hopper are moved out of engagement, the improvement comprising:

an spring arm coupled to the source of motor power to move the hopper and blade relative to one another through the first phase, said arm being extendable as a function of the axial force exerted on said arm when cutting during the first phase, said arm extending in length to limit the force between the cutting blade and the food product in the hopper during the first phase of the cycle, the cutting blade engaging and cutting the food product during the second phase when said arm is extended, the duration of said cutting during the second phase being a function of the amount by which said arm is extended, wherein, when the arm is extended during the second phase and the slicing of the food product is not completed, the cycle is repeated until the food product is sliced.

12. The slicing machine of claim 11 further comprising:

a rigid rod coupled between the platform and the source of motor power to provide transmission of force along said rod during the second phase of the cycle to move the hopper and blade out of engagement during at least part of the second phase of said cycle.

* * * * *